United States Patent [19]

Peter

[11] Patent Number: 5,044,935

[45] Date of Patent: Sep. 3, 1991

[54] METHOD AND APPARATUS FOR OPERATING A FIRING PLANT USING FOSSIL FUELS

[75] Inventor: Hans Peter, Urdorf, Switzerland

[73] Assignee: Asea Brown Boveri Ltd., Baden, Switzerland

[21] Appl. No.: 491,734

[22] Filed: Mar. 12, 1990

[30] Foreign Application Priority Data

Mar. 15, 1989 [CH] Switzerland ............. 947/89

[51] Int. Cl.$^5$ ................. F23M 9/00; F23M 3/00
[52] U.S. Cl. ..................... 431/182; 431/11; 431/9; 126/99 R
[58] Field of Search ............ 431/182, 2, 9, 5, 11, 431/1; 126/99 R

[56] References Cited

U.S. PATENT DOCUMENTS

| | | |
|---|---|---|
| 4,595,356 | 6/1986 | Gaysert et al. ............. 431/1 |
| 4,929,172 | 5/1990 | Zinn et al. ................. 431/1 |
| 4,932,861 | 6/1990 | Keller et al. . | |

FOREIGN PATENT DOCUMENTS

| | | |
|---|---|---|
| 0166329 | 1/1986 | European Pat. Off. . |
| 0210462 | 2/1987 | European Pat. Off. . |
| 3501189 | 7/1986 | Fed. Rep. of Germany . |
| 1587944 | 4/1970 | France . |
| 2370235 | 6/1978 | France . |

OTHER PUBLICATIONS

Patent Abstracts of Japan, vol. 8, Nr. 124 (M-301) (1561), Jun. 9, 1984.

*Primary Examiner*—Larry Jones
*Attorney, Agent, or Firm*—Burns, Doane, Swecker & Mathis

[57] ABSTRACT

In a firing plant which is operated with fossil fuels, the exhaust gases (A) from the combustion space (22) are cooled in a heat exchanger (X). A part of these cooled exhaust gases (A') are mixed with fresh air (L) and are conducted by means of a fan (D) in the direction of the burner (Z). This exhaust gas/fresh air mixture forms the combustion air (15) for the burner (Z). Before the introduction of this combustion air (15) into the burner (Z), it is again heated in the heat exchanger (X'). The combustion air (15) preheated in this way ensures complete evaporation of a liquid fuel (12) and acts against the high flame temperature peaks in the combustion space (22) immediately after the burner (Z), which are responsible for the formation of NO$_x$. The burner (Z) can be operated with liquid and/or gaseous fuel.

8 Claims, 3 Drawing Sheets

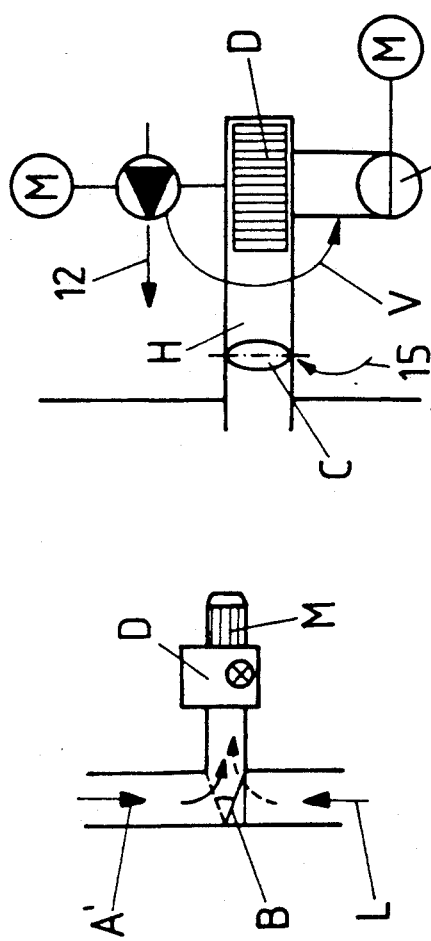
FIG. 2
FIG. 3
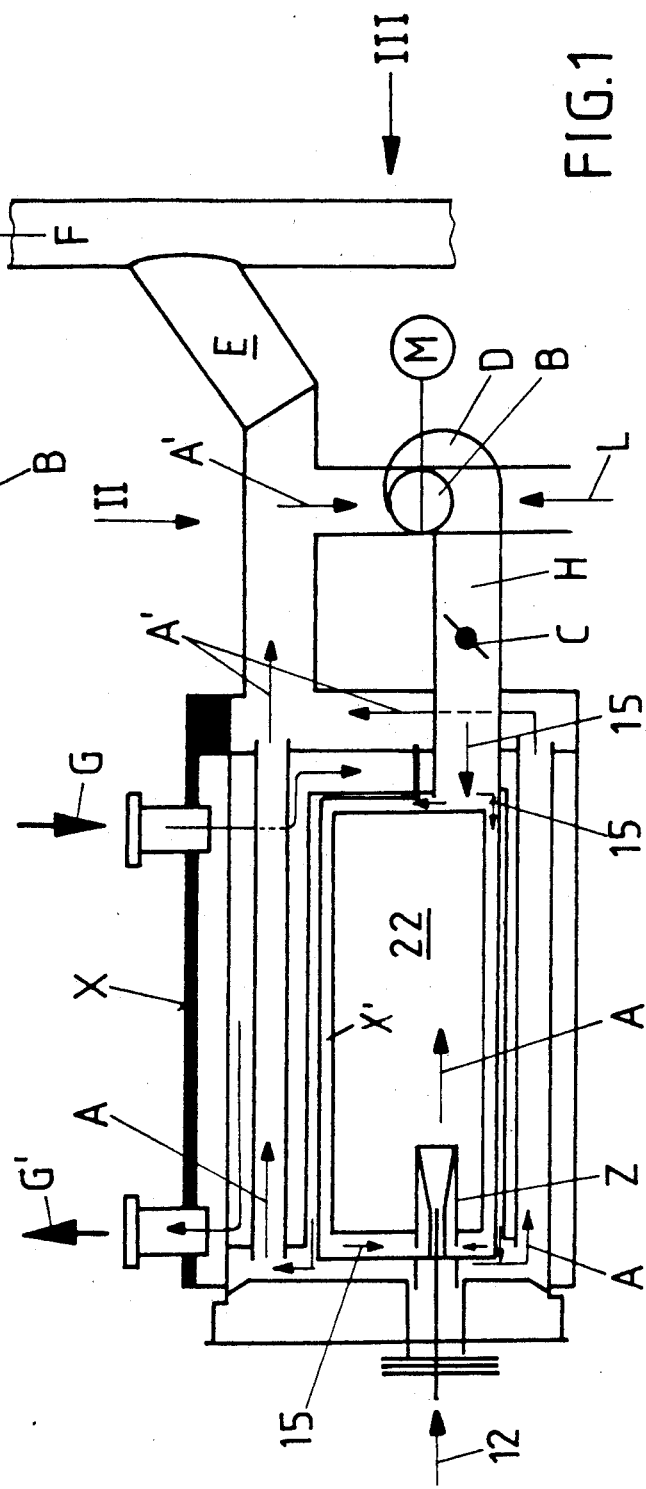
FIG. 1

METHOD AND APPARATUS FOR OPERATING A FIRING PLANT USING FOSSIL FUELS

BACKGROUND OF THE INVENTION

1. Field of the Invention

The invention concerns a method for operating a firing plant using fossil fuels by means of a burner. It also concerns the design of such a burner.

2. Discussion of Background

In firing plants for central heating, for example, the fuel—in the conventional type—is sprayed by means of a nozzle into a combustion space and burned there with the addition of combustion air. The operation of such firing plants is fundamentally possible by means of a gaseous or liquid fuel. When using a liquid fuel, the weak point with respect to clean combustion in terms of $NO_x$, CO and UHC emissions is mainly associated with the complete atomization of the fuel necessary and its mixture with the combustion air.

When a gaseous fuel is used, the combustion is characterized by a substantial reduction in terms of pollutant emissions because the gasification of the fuel—in contrast to a liquid fuel—is already provided. Particularly in the case of firing plants for domestic use, however, gas-operated burners have not become generally accepted, despite the many relevant advantages which such firing plants can offer. The reason for this may be that the procurement of gaseous fuels requires an expensive infrastructure, also that these gasification burners require much maintenance and finally, last but not least, that undesirable deposits can form in the gasification chamber during operation. These very rapidly impair the effectiveness of the gasification substantially, leading to deterioration of the combustion and to an increase in the pollutant emissions. If no gaseous fuel is available, the firing plant goes out of action.

If, in consequence, a liquid fuel is used, the quality of the combustion in terms of low pollutant emissions depends substantially on whether an optimum degree of mixing of the fuel/fresh air mixture has been successfully prepared, i.e. whether complete gasification of the liquid fuel has been ensured. The problems of operation in the part load range, as dealt with in EP-A2-0 166 329, should also be noted. Various other attempts which have become known to operate with a leaner mixture at part load have invariably failed because in these cases, the burn-out deteriorates and the CO/UHC emissions increase greatly. In the specialist language, this condition is described under the designation of CO/UHC-$NO_x$ dilemma. Providing a premixing zone for the fuel/fresh air mixture before the actual combustion zone does not lead to the objective of an operationally reliable burner either because in this case, there is the imminent danger that a flashback from the combustion zone into the premixing zone could damage the burner.

A burner is known from EP-A1-0 210 462 which is satisfactory for the combustion of liquid and, if need be, gaseous fuel. This burner manages without a premixing zone. The spraying in of the liquid fuel and its preparation for mixing with the added air towards gasification condition occurs in such a way that the generation of premixing becomes superfluous. Since, with this subject-matter, the momentum with which the liquid fuel is sprayed in is matched to the load of the plant, the mixture is never too lean or too rich. Although the advantages of the burner considered here in terms of pollutant emissions cannot be denied, it has been found that the $NO_x$ and CO emission values, although they are lower than the legal limiting values, will have to be further substantially reduced in future. It has also been found that coking problems, arising from the way in which the liquid fuel is sprayed in, cannot be excluded and that the fuel spraying system itself is not easy to deal with. A further problem is provided by the excess air and its temperature in the course of the mixture formation in this burner, which does not ensure complete evaporation and hence gasification of the liquid fuel before ignition of the mixture. It has also been found that the use of such a burner in atmospheric-pressure firing plants does not provide optimum operation because, even if the degree of gasification of the liquid fuel were substantially achieved, there would be no effect on the locally high flame temperature peaks which, as is known, are responsible for the formation of $NO_x$.

SUMMARY OF THE INVENTION

Accordingly, one object of this invention, as claimed in the claims, is to provide, in firing plants of the type mentined at the beginning, a novel method and burner which minimize the pollutant emission values in both liquid and gaseous fuels and also in the case of mixed operation.

The essential advantage of the invention may be seen in the fact that action is taken simultaneously on the fuel and on the flame temperature in the combustion space. If the firing plant is operated with liquid fuel, exhaust gas recirculation ensures that a completely evaporated fuel/combustion air mixture can be supplied to combustion. This improvement caused by the exhaust gas recirculation then also influences the flame temperature in such a way that peak temperatures, which are responsible for the formation of $NO_x$, no longer occur. If, on the other hand, the firing plant is operated with a gaseous fuel, a gasified mixture is, of course, already present but the flame temperature is also positively affected in this case. In the case of mixed operation, all the advantages apply simultaneously.

The improvement in terms of pollutant emissions of, generally speaking, firing plants operated using fossil fuels is not therefore merely a few percentage points; the $NO_x$ emissions alone are minimized in such a way that those measured are possibly only 10% of what the legal limits tolerate. In consequence, a completely new quality level is achieved by this means.

A further advantage of the invention appears from the possibility that a recirculation of cooled exhaust gases will permit optimum operation in atmospheric-pressure firing plants operated under near stoichiometric conditions.

Advantageous and desirable extensions of the subject-matter of the invention are claimed in the further dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a firing plant with exhaust gas recirculation and a device for treating the temperature of the exhaust gas and for mixing the exhaust gases with fresh air to provide combustion air, FIG. 2 shows a view in the region of the fan and drive for the mixing of exhaust gas with fresh air and for the supply of this combustion air to the burner, FIG. 3 shows a view in the region of a flap which indicates the quantitative proportions of exhaust gas and fresh air.

DESCRIPTION OF THE PREFERRED EMBODIMENTS

Figure 4:
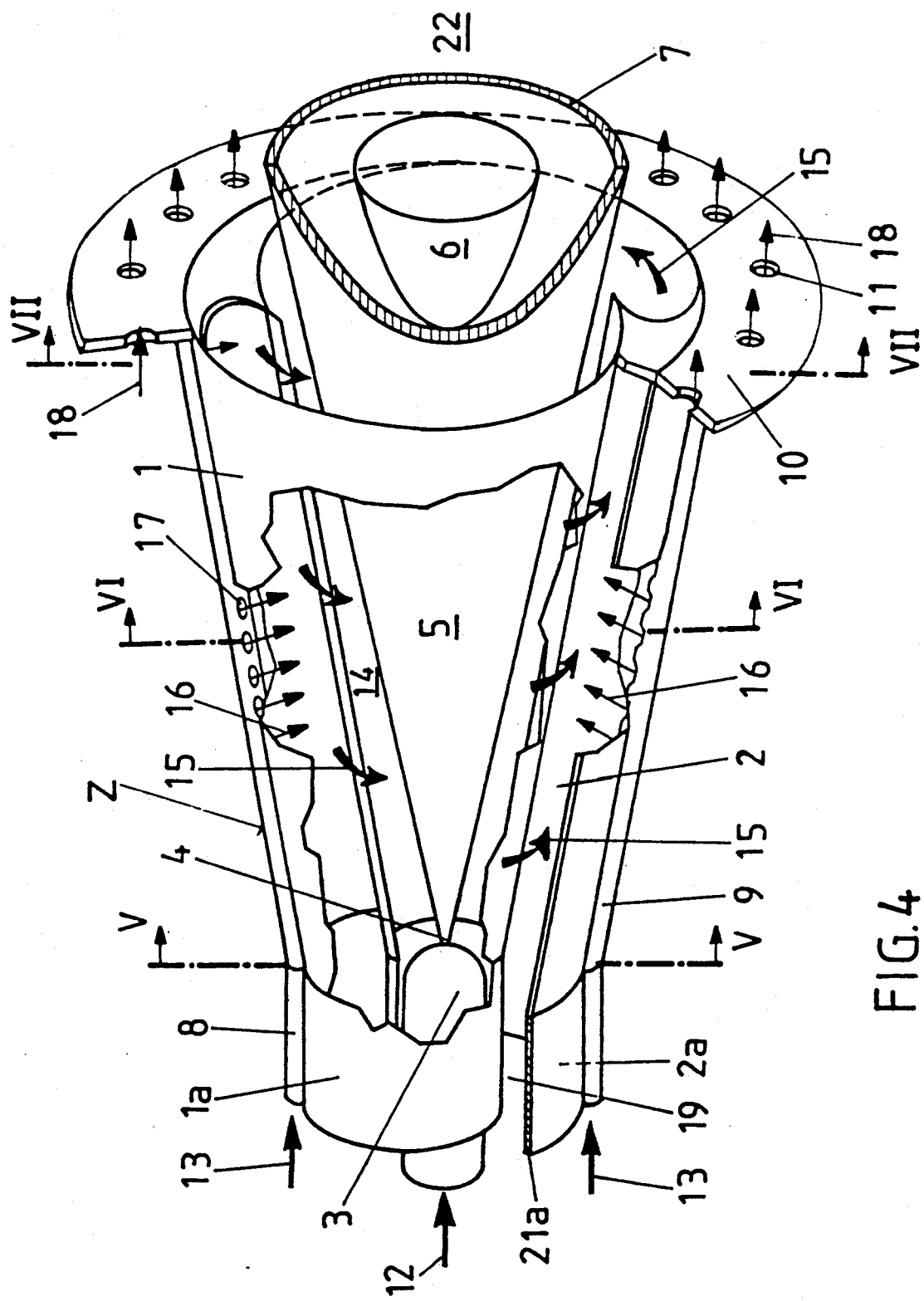
FIG. 4 shows a burner for liquid and/or gaseous fuels in perspective representation, appropriately sectioned.

Referring now to the drawings, wherein like reference numerals and letters designate identical or corresponding parts throughout the several figures, in which the flow directions of the various media are indicated by arrows and in which all the elements not necessary for direct understanding of the invention are omitted, FIG. 1 shows a firing plant with a burner Z, which in this case only operates on a liquid fuel 12. A burner which can operate with both liquid and gaseous fuels or in mixed operation is shown in FIGS. 4–7. The hot exhaust gases A from the combustion space 22 pass through a heat exchanger X whose heat exchange is maintained by water, this being expressed by the water inlet G and the water outlet G'. The heat exchange can, of course, also be achieved by means of other media. The flow of the hot exhaust gases A through the heat exchanger X is approximately reproduced by the directions of the arrows designated by A. The individual chambers must be envisaged as trains of pipes surrounded by a flow of water. The exhaust gases A' which have been cooled and which have a temperature of only about 180° C. after passing through the heat exchanger X then flow via a smoke pipe E to the chimney F. Before the beginning of the smoke pipe E, there is a branch through which a desired proportion of exhaust gas can be extracted. A duct, diametrically opposite to it, introduces fresh air L with a temperature of about 15° C. The metering of cooled exhaust gases A' and fresh air L is undertaken by a flap B which is at the level of a recirculation duct H which conducts the combustion air 15, which is now an exhaust gas/fresh air mixture, via a fan D to the burner Z. The mass flow of this combustion air 15 is controlled, after its metering, by means of a butterfly C placed in the recirculation duct H. As the flow arrows are intended to indicate, the combustion air 15, after metering and mass flow control, does not flow directly to the burner Z but passes through a second heat exchanger X' so as to accept heat, i.e. the combustion air 15 is heated before its use and, in fact, by the heat from the exhaust gases A. The objective of this method is to minimize the pollutant emissions; this can be achieved if care is taken to ensure that the liquid fuel in the burner Z can be completely evaporated before reaching the ignition location of the mixture. In order to satisfy this requirement, exhaust gases A' are extracted on the way to the smoke pipe E, as already described above with respect to the device, mixed with fresh air L in the ratio 7:10 and conducted into the heat exchanger X' by means of the fan D already mentioned. These heat exchangers X and X' are preferably located in the firing space of the boiler, which cannot be deduced from the diagrammatic FIG. 1. The combustion air 15 flowing through the heat exchanger X' is heated, by this means, to about 400° C. before it is conducted to the burner Z. The advantage of this prepared combustion air 15 lies not only in the fact that the liquid fuel 12 can be reliably evaporated but also in the fact that the flame temperature in the combustion space 22 has a uniform profile which obviates the danger of the formation of $NO_x$. Even if gaseous fuel is used, the latter fact can still be noticed in a positive manner so that it is immediately appropriate to employ exhaust gas recirculation even when the burner Z is operated with a gaseous fuel. The type of exhaust gas recirculation selected here, in which the exhaust gases A are first cooled and then mixed with fresh air L to provide combustion air 15, has the advantage that the metering elements, fan and control equipment are subjected to low temperatures, which would not be the case if the exhaust gases A were not previously cooled in the heat exchanger X. As already stated, the temperature of the cooled exhaust gases A' is about 180° C. and that of the fresh air L is about 15° C.; the combustion air 15 therefore has a temperature of about 60° C. before flowing back into the heat exchanger X. None of the elements such as the metering flap B, the casing D or the control butterfly C need therefore be designed in highly alloyed heat-resistant alloys.

FIG. 2 shows, again mainly diagrammatically, the arrangement of the recirculation duct H relative to the fan D, the conveying of the liquid fuel 12 by means of a drive M, the metering flap B with drive M and the butterfly C for controlling the combustion air mass flow 15. The arrow V is intended to indicate an option consisting of the fact that the liquid fuel can be mixed into the combustion air 15 after the fan D.

Figure 5:
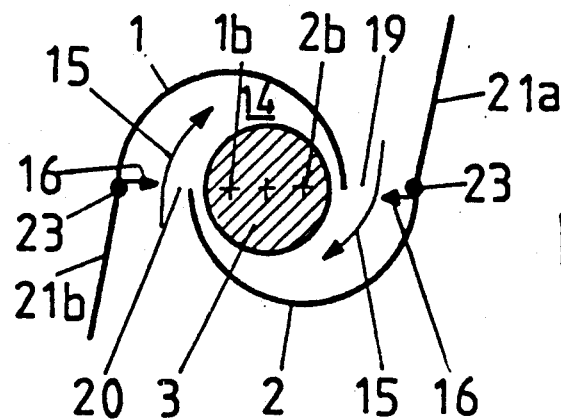
FIGS. 5, 6, 7 show corresponding sections through the planes V—V (FIG. 5) VI—VI (FIG. 6) and VII—VII (FIG. 7), these sections being only a diagrammatic, simplified representation of the burner of FIG. 4.
Figure 6:
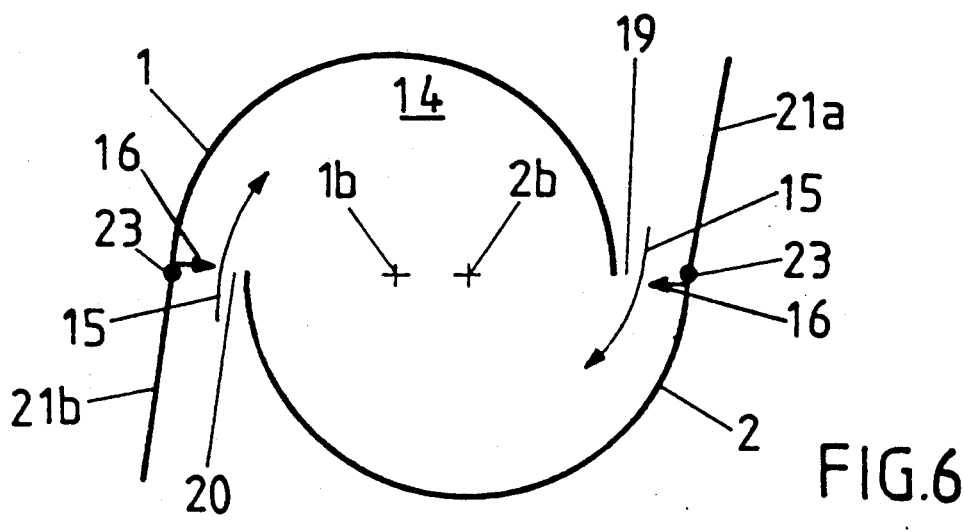
Figure 7:
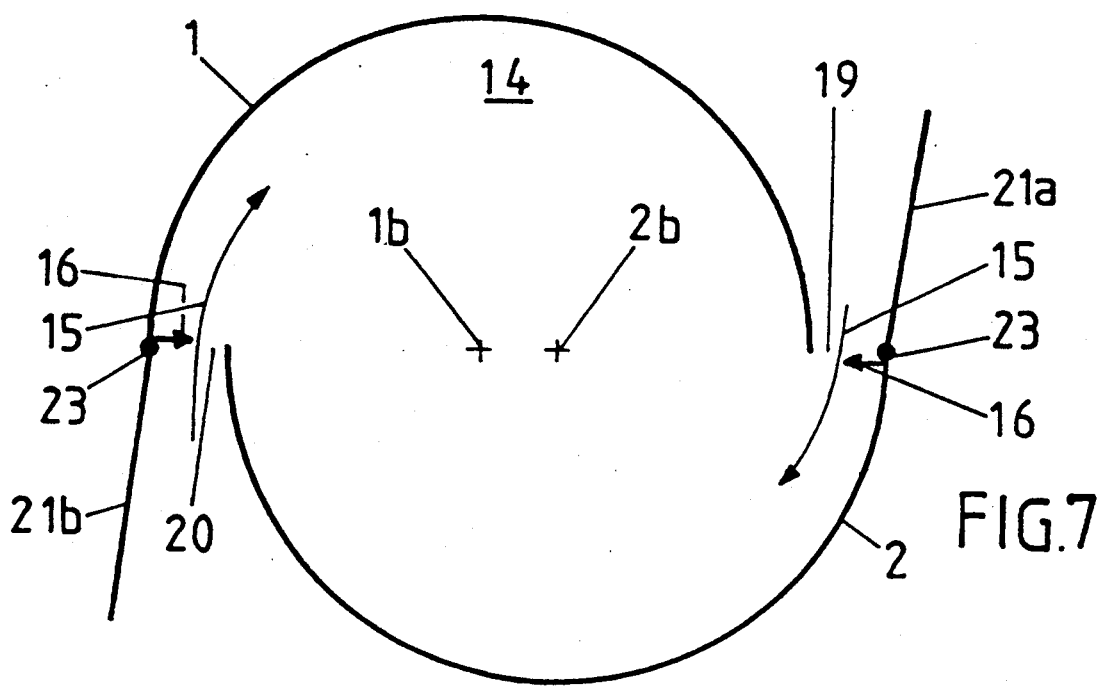

In order to understand the construction of the burner Z better, it is advantageous for the reader to consider the individual sections of FIGS. 5-7 at the same time as FIG. 4. Furthermore, in order to avoid making FIG. 4 unnecessarily complicated, the guide plates 21a, 21b shown diagrammatically in FIGS. 5-7 are only indicated. In what follows, selective reference will be made in the description of FIG. 4, as required, also to the remaining FIGS. 5-7.

The burner Z of FIG. 1 consists of two half, hollow part-conical bodies 1, 2, which are located offset relative to one another, one upon the other. The offsetting of the particular centerlines 1b, 2b of the part-conical bodies, 1, 2 relative to one another provides in each case, on both sides and in mirror arrangement, a tangential air inlet slot 19, 20 (FIGS. 5-7) through which the combustion air 15 (exhaust gas/fresh air mixture) flows into the inner space of the burner Z, i.e. into the conical hollow space 14. The two part-conical bodies 1, 2 each have a cylindrical initial part 1a, 2a, which parts also extend offset relative to one another in a manner analogous to the part-conical bodies 1, 2, so that the tangential air inlet slots 19, 20 are present from the beginning. A nozzle 3 is accommodated in this cylindrical initial part 1a, 2a and its fuel spray inlet 4 coincides with the narrowest cross-section of the conical hollow space 14 formed by the two part-conical bodies, 1, 2. The burner Z can, of course, be designed to be purely conical, i.e. without the cylindrical initial parts 1a, 2a. Both part-conical bodies 1, 2 optionally have one fuel pipe 8, 9 each. These are provided with openings 17 through which a gaseous fuel 13 can be mixed into the combustion air 15 flowing through the tangential air inlet slots 19, 20. The position of these fuel pipes 8, 9 is shown diagrammatically in FIGS. 2-4: the fuel pipes 8, 9 are fitted at the end of the tangential air inlet slots 19, 20 so that the mixing 16 of the gaseous fuel 14 with the entering combustion air 15 also occurs at this location. Mixed operation with both types of fuel is, of course, possible. At the combustion space 22 end, the burner has a collar-shaped end plate 10 acting as a possible retention feature for the part-conical bodies 1, 2 and having a number of holes 11 through which, if required, diluent air or cooling air 18 can be supplied to the front part of the combustion space 22 or to its wall. The liquid fuel 12 flowing through the nozzle 3 is sprayed into the conical hollow space 14 with an acute angle in such a way that the most homogeneous possible conical fuel spray occurs at the burner outlet plane. The fuel spray inlet 4 can involve an air-supported nozzle or pressure atomization. The conical liquid fuel profile 5 is enclosed by a tangentially inflowing rotating combustion air flow 15. In the axial direction, the concentration of the liquid fuel 12 is continuously reduced by the combustion air 15 mixed with it. If gaseous fuel 13/16 is used, the formation of the mixture with the combustion air 15 occurs directly at the end of the air inlet slots 19, 20. Where liquid fuel 12 is sprayed in, the optimum homogeneous fuel concentration is achieved over the cross-section in the region of the vortex collapse, i.e. in the region of the reverse flow zone 6. The ignition occurs at the tip of the reverse flow zone 6. It is only at this location that a stable flame front 7 can occur. Burn-back of the flame into the internals of the burner Z, such as is latently the case with known premixing lines, attempts to combat which are made by means of complicated flame holders, does not need to be feared in the present case. If the combustion air 15 is preheated as is explained with respect to FIG. 1, an accelerated complete evaporation of the liquid fuel 12 occurs before the point is reached at the outlet of the burner Z at which the mixture can ignite. The degree of evaporation depends, of course, on the size of the burner Z, the droplet size distribution and the temperature of the combustion air 15. Independent, however, of whether the homogeneous droplet premixing is achieved by combustion air 15 of low temperature or, additionally, complete or only partial droplet evaporation is achieved by preheated combustion air 15, the emissions of nitrogen oxide and carbon monoxide are low, provided the air excess is at least 60%, so that an additional arrangement for minimizing the $NO_x$ emissions is available here. The pollutant emission values are at their lowest in the case where there is complete evaporation before entry into the combustion zone. The same also applies to operation near stoichiometric conditions if the excess air is replaced by recirculating exhaust gas. Narrow limits have to be observed in the design of the part bodies 1, 2 with respect to conical inclination and the width of the tangential air inlet slots 19, 20, so that the desired flow field of the air for flame stabilization occurs with its reverse flow zone 6 in the region of the mouth of the burner. In general, it may be stated that a reduction of the air inlet slots 19, 20 displaces the reverse flow zone 6 further upstream, in which case, however, the mixture would then ignite earlier. It may, however, be stated that the reverse flow zone 6, once fixed geometrically, is intrinsically positionally stable because the rate of rotation increases in the flow direction in the region of the conical shape of the burner. The design of the burner is extremely suitable for changing the size of the tangential air inlet slots 19, 20 for a given installation length of the burner: if the part-conical bodies 1, 2 are moved together or apart, the distance between the two centerlines 1b, 2b is decreased or increased and the gap size of the tangential air inlet slots 19, 20 changes correspondingly, as can be seen particularly well from FIGS. 5-7. The part-conical bodies 1, 2 can, of course, also be displaced relative to one another in another plane and they can even be arranged to overlap. It is even possible to displace the part-conical bodies 1, 2 in a spiral relative to one another by opposite rotational motion. It is therefore possible to arbitrarily vary the shape and size of the tangential air inlets 19, 20 so that the burner can be matched to the individual case without changing its installation length.

The position of the guide plates 21a, 21b can also be seen from FIGS. 5-7. They have flow inlet functions in which, corresponding to their length, they extend the particular end of the part-conical bodies 1 and 2 in the incident flow direction of the combustion air 15. The ducting of the combustion air into the conical hollow space 14 can be optimized by opening or closing the guide plates 21a, 21b about the center of rotation 23; this is particularly necessary when the original gap size of the tangential air inlet slots 19, 20 is changed. The burner Z can also be operated without guide plates 21a, 21b.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Method for operating a firing plant using fossil fuels by means of a burner, wherein the exhaust gases (A) from the combustion space (22) are cooled in a water-cooled heat exchanger (X), part of these cooled exhaust gases (A') are mixed with fresh air (L) to provide combustion air (15) and this combustion air (15) is subsequently preheated in a further heat exchanger (X') before introduction into the burner (Z).

2. Method as claimed in claim 1, wherein the cooled exhaust gases (A') are mixed with fresh air in the ratio 7:10.

3. Method as claimed in claim 1, wherein the combustion air (L) is preheated to 400° C. before it is supplied to the burner (Z).

4. A burner system for a firing plant using fossil fuels comprising:

a frame having a combustion space;

a burner mounted on said frame, said burner having an exhaust nozzle substantially disposed in said combustion space;

a first heat exchanger disposed on said frame and substantially surrounding said combustion space such that exhaust gases from said burner are cooled by said first heat exchanger to form cooled exhaust gases;

duct means mounted on said frame for mixing a portion of said cooled exhaust gases with substantially fresh air to form combustion air;

a second heat exchanger disposed on said frame and substantially surrounded by said first heat exchanger, said second heat exchanger providing fluid communication between said duct means and a fluid inlet of said burner such that said combustion air is preheated prior to introduction to said fluid inlet of said burner; and said burner comprising at least two hollow part-conical bodies mated together in an offset relationship and having tangential air inlet slots for receiving said combustion air and having a conical inclination increasing in a flow direction, said air inlet slots extending substantially the length of said burner, said burner including a nozzle means for supplying a conical column of liquid fuel substantially along the length of said burner, said nozzle means being disposed between said conical bodies at a burner head of said burner.

5. A burner system as set forth in claim 4, wherein said hollow part-conical bodies are displaceable relative to each other.

6. A burner system as set forth in claim 4, wherein said nozzle means is an air-supported nozzle.

7. A burner system as set forth in claim 4, wherein said nozzle means is a pressure atomizer.

8. A burner system as set forth in claim 4, wherein said hollow part-conical bodies include movable guide plates connected at said tangential air inlets.

* * * * *